Patented Dec. 2, 1924.

1,517,650

UNITED STATES PATENT OFFICE.

EDUARD MOUFANG, OF KIRN-ON-THE-NAHE, GERMANY, ASSIGNOR TO THE CORPORATION OF NATHAN-INSTITUT AKTIENGESELLSCHAFT, OF ZURICH, SWITZERLAND.

METHOD OF TREATING SUBSTANCES USED IN FERMENTING INDUSTRY.

No Drawing.   Application filed May 31, 1919.   Serial No. 301,116.

*To all whom it may concern:*

Be it known that I, EDUARD MOUFANG, a citizen of Germany, and resident of Kirn-on-the-Nahe, Germany, have invented new and useful Improvements in a Method of Treating Substances Used in Fermenting Industry (for which I have filed applications for patents in Germany, September 13, 1916, Patent No. 327,498; Germany, May 23, 1917, Patent No. 330,341; Austria, August 20, 1917; Switzerland, September 23, 1918, Patent No. 94,432; Netherlands, October 25, 1918; Sweden, January 8, 1919, Patent No. 48,841; Denmark, January 8, 1919), of which the following is a specification.

It is a well known fact that by its repeated use in the manufacture of beer the yeast loses in various respect its qualities necessary for fermentability; the yeast "degenerates". The various tests made to determine the cause of this led to quite different opinions, but a remedy has not heretofore been found. The washing of the yeast with water has but a very slight effect. The proposed treatment by acids had only partial success.

As the cause of loss of qualities promoting fermentation there has been discovered by numerous tests a substance originating from the glumes of the barley-corn or like material which may be called "testin-acid" (Testinsäure). The formula of testin-acid has not yet been defined. From provisional tests the obstacle to fermentation appears however in the form of an acid salt, the testin-acid with a residue of lupuline. If the radical of testin-acid is designated by T, and the residue of lupuline by L, the common type would be

wherein the H could be replaced by metals or other monovalent radicals. This substance is very colloidal and may be called "testilupine" (Testilupin).

This acid salt is a chemical compound. In water, wort and beer it is soluble to insoluble according to the reaction of the medium, and in its original colloidal condition it readily absorbs water and swells and therefore cannot be filtered; it can however easily be converted into a readily soluble salt of the type

wherein Me designates a metal of the group of alkalies, alkaline earths, ammonium.

The method for removing this substance is essentially based on this fact. It has hitherto been considered that a treatment of the yeast by alkalies impairs the fermenting power of yeast (Chemie der Hefe "der alkoholischen Gärung" by W. Euler and P. Lindner, p. 291).

For producing yeast for cattle, it is true, the yeast has been treated with alkalies, even in concentrations which are used with the new method. As in this case it was irrelevant whether the cell was destroyed or not, this treatment was performed without knowledge of testin-acid, and in such manner, particularly at so high temperatures and during so long a time, that the vitality of the cell was very much reduced, so that the product would be absolutely useless for brewing purposes. Of course, no attempt was made to maintain the biological qualities of the yeast since the method was directed to quite other purposes, and because the bitter stuffs are not at all identical with testilupine.

According to this invention the treatment with alkalies should be extraordinarily mild as compared with the known method. There are used concentrations of 0.05 to 0.25% calculated on the basis of free alkali, and these alkalies are allowed to act during limited periods. The tests made show that there takes place a peculiar process. I suppose as the result of these tests—and there are several facts which go far to prove this supposition—that the testilupine is in the form of a thin cover on the surface of the yeast cells, and prevents quite mechanically the biological activity of the yeast by enclosing the yeast cells and filling up the pores. As a result of the researches of others I assume that the cell substance is destroyed by the action of the alkali, so that its usefulness is also destroyed.

The problem to be solved was therefore to treat the yeast with alkalies in such a manner that on the one hand the soluble salt should be formed, but on the other hand an action on the cell itself would be prevented. There must also be considered that the action of the alkali on the testilupine depends on the physiological condition of the yeast, and requires apparently some time. However it seems to be favorable, that the testilupine is on the surface of the cell, forming thus a protecting wrapper. The general method of treating the yeast would be to use solvents of testilupin under conditions of time, heat and concentration efficient to bring about the complete removal of the testin-acid (testilupine) without affecting the cell itself, or generally a mild, controllable treatment lasting only a relatively short time.

It has been found that a solution of the indicated concentrations is quite satisfactory at the temperature of the succeeding fermenting process, preferably 4 to 7° C. during 12 to 48 hours. The yeast is stirred up and settles down firmly at the end of the period. The water let off is dyed deeply red-brown by the salt of testilupine, and it still contains some free alkali. The last trace of alkali can be removed by a single change of water. The treatment with the alkaline solution should be repeated if the testin-acid is not completely removed.

As an example of the manner in which my new process may be employed, an aqueous solution of ammonia is prepared, of a strength of 0.15% calculated as free alkali; the used yeast is introduced into this solution, enough of the latter being used to permit all of the yeast particles to be freely agitated; the mixture is allowed to stand, at a temperature of 7° C., until the yeast has settled down firmly, a result which is reached in from 12 to 48 hours; the supernatant liquid, which is of a deep red-brown color, is then drawn off, and the yeast washed with fresh water.

By purifying the yeast in this manner, its fermenting power can be considerably increased. For example it has been found, that the same result is obtained with a quantity of 17 litres of treated yeast, as with 31 litres of the same, but untreated yeast, that the fermenting process became quite normal therewith, and remained so in the succeeding fermentations. Besides the ammonia above mentioned the alkalies or alkaline earths can be applied in the form of oxides, hydroxides, carbonates, bicarbonates, etc.

Moreover it has been proved expedient to aerate effectively the yeast treated in this manner in a weak wort of about 2% Balling during 60 minutes immediately before the yeast admixture. The yeast so purified can then be used in brewing beer in the ordinary manner.

The discovery that the glumes contain testin-acid, and that the latter can be removed by alkalies, can also be utilized by removing it at an earlier moment, viz. during the barley softening. This form of executing my invention consists therefore essentially in removing the noxious substance at an earlier period of the whole brewing process, as in the example described above, in order to keep the yeast pure.

According to this manner of carrying out my invention, an efficient alkali is added to the water used for barley softening, which alkali under proper conditions of treatment, including the application of heat dissolves the testin-acid in several hours, without damaging the barley-corn itself.

For cleaning purposes various substances, as well of acid as of alkaline reaction, have been added hitherto to the water for barley softening, with the aim to disinfect and for general cleaning purposes, without apprehending the special action of such chemical substances, which, as the testin-acid, can produce troubles in the brewing and fermenting processes. From substances of alkaline reaction there were used however only alkaline earths, and only in connection with the latter has the use of carbonate of sodium been proposed. This however can not be successful, because the salts of alkaline earths, especially the calcium salt of testin-acid, become difficultly soluble or insoluble so that the eventual action of carbonate of sodium is prevented. This applies also to the calcium salt of testilupine, whilst the magnesium salt of testin-acid is more soluble, especially at higher temperatures, and the magnesium salt of testilupine is sufficiently soluble even at the freezing point, so that it can be removed from the yeast. Testin-acid being unknown, of course no efforts were heretofore made to remove it. The solution of the testin-acid appears from the dyeing of the water for barley softening even to a dark brown colour, so that the appearance of this colour is itself a characteristic feature of the new method. It has, to be sure, heretofore been proposed to heat the water for barley softening, and to finish then the softening with cold water; warm water alone, however, does not produce the required result of lixiviation. Generally one would have expected a heavy damage to the barley-corn by the treatment with comparatively strong alkalies, and in the heat. The water used for barley softening may contain up to 5 gr. per litre of substances having an alkaline reaction for instance carbonate of potassium without interfering with my process; the duration of action may be 1 to 5 hours at temperatures of about 30 to 50° C. Alkalies have also been used for other purposes, viz, for forming nutritious salts at the softening process, by adding subsequently acids, without any knowledge however of the action of the whole process on the yeast.

The softening process when used in connection with the present method is preferably performed by discharging the barley into a vessel containing a solution of a suitable alkali, or alkaline earth, for instance ammonia, of a suitable concentration, for instance 0.05% to 0.25%, calculated as free alkali, and at a suitable temperature, for instance from 30° to 50° C., continuing the treatment under active stirring, pumping, or other similar method of agitation until the desired degree of lixiviation is attained. Thereupon the hot water is displaced from below by cold water, and, if necessary to secure the desired effect, the process may be repeated. Testin-acid occurs in high percentages in certain grades of barley which heretofore could not be used for the manufacture of beer, but I have found that by my process barleys of such grades can be employed successfully for brewing purposes,—a fact which is of great economic importance.

The separation of testin-acid has also a favorable effect with regard to the purity, the taste, the froth contents and consistence of the beer.

Of course, my new process can be applied also to other grains used for fermenting purposes and containing glumes or testin-acid, for instance oats.

I claim:

1. In the process of brewing beer, the method which consists in removing testin-acid from substances containing the same to improve them for use in the beer-brewing process which consists in treating such substances with a dilute solution of a suitable substance having an alkaline reaction until such acid has been converted into a readily soluble salt, then discontinuing such treatment before the yeast is substantially injured for beer making, separating the resulting salt solution, and using the remaining substance for brewing beer.

2. In the process of brewing beer, the method which consists in removing testin-acid from substances containing the same to improve them for use in the beer-brewing process which consists in treating such substances with a dilute solution of ammonia until such acid has been converted into a readily soluble salt, then discontinuing such treatment before the yeast is substantially injured for beer making, separating the resulting salt solution, and using the remaining substance for brewing beer.

3. In the process of brewing beer, the method which consists in treating used yeast which consists in treating the same with a dilute solution of a suitable substance having an alkaline reaction until the testin-acid contained in such yeast has been converted into a readily soluble salt, then discontinuing such treatment before the yeast is substantially injured for beer making, separating the resulting salt solution, and using the remaining substance for brewing beer.

4. In the process of brewing beer, the method which consists in treating used yeast which consists in treating the same with a dilute solution of ammonia until the testin-acid contained in such yeast has been converted into a readily soluble salt, then discontinuing such treatment before the yeast is substantially injured for beer making, separating the resulting salt solution, and using the remaining substance for brewing beer.

5. In the process of brewing beer, the method which consists in removing testin-acid from substances containing the same to improve them for use in the beer-brewing process which consists in treating such substances with a dilute solution of a suitable substance having an alkaline reaction, at a temperature of from 2° to 7° C., until such acid has been converted into a readily soluble salt, then discontinuing such treatment before the yeast is substantially injured for beer making, separating the resulting salt solution, and using the remaining substance for brewing beer.

6. The method of improving the fermenting power of substances used in beer-brewing and containing testin-acid, which consists in treating said substances with an alkaline solution of such quantity and under such conditions of temperature, time, and dilution as to convert the testin-acid contained in said substances into a soluble salt and arresting such treatment before the fermenting power of such sustances is reduced.

7. The method of removing testin-acid from substances containing the same to improve them for use in beer-brewing, which consists in treating such substances with a dilute solution of a suitable substance having an alkaline reaction, of a concentration of from .05 to .25% calculated on the basis of free alkali, and arresting such treatment as soon as the testin-acid has been converted into a soluble salt.

In testimony, that I claim the foregoing as my invention, I have signed my name in presence of a witness, this seventh day of April 1919.

EDUARD MOUFANG.

Witness:
RICHARD WIRTH.